United States Patent
Cunico

(10) Patent No.: US 8,598,838 B2
(45) Date of Patent: Dec. 3, 2013

(54) ELECTRIC VEHICLE HAVING A BATTERY CONFIGURED FOR RECHARGING VIA AN ON-BOARD GENERATOR POWERED BY RENEWAL ENERGY SOURCES

(76) Inventor: Michele Cunico, Rome (IT)

( * ) Notice: Subject to any disclaimer, the term of this patent is extended or adjusted under 35 U.S.C. 154(b) by 300 days.

(21) Appl. No.: 12/935,482

(22) PCT Filed: Apr. 9, 2009

(86) PCT No.: PCT/IT2009/000157
§ 371 (c)(1),
(2), (4) Date: Sep. 29, 2010

(87) PCT Pub. No.: WO2009/125449
PCT Pub. Date: Oct. 15, 2009

(65) Prior Publication Data
US 2011/0025256 A1 Feb. 3, 2011

(30) Foreign Application Priority Data
Apr. 9, 2008 (IT) .............................. RM2008A0185

(51) Int. Cl.
*H02J 7/00* (2006.01)
(52) U.S. Cl.
USPC ........................................................ 320/101
(58) Field of Classification Search
USPC ........................................................ 320/101
See application file for complete search history.

(56) References Cited

U.S. PATENT DOCUMENTS

| | | | |
|---|---|---|---|
| 3,984,052 A * | 10/1976 | Di Palma | 239/749 |
| 4,168,759 A | 9/1979 | Hull | |
| 5,986,429 A | 11/1999 | Mula | |
| 6,897,575 B1 * | 5/2005 | Yu | 290/44 |
| 7,135,786 B1 | 11/2006 | Deets | |
| 7,434,636 B2 * | 10/2008 | Sutherland | 180/2.2 |
| 2002/0153178 A1 * | 10/2002 | Limonius | 180/2.2 |
| 2003/0222479 A1 | 12/2003 | Shugar et al. | |
| 2006/0290139 A1 * | 12/2006 | Takeuchi | 290/54 |

FOREIGN PATENT DOCUMENTS

| | | |
|---|---|---|
| WO | WO 2006/056107 A | 6/2006 |
| WO | WO 2007/025096 A1 | 3/2007 |

OTHER PUBLICATIONS

International Search Report, Oct. 27, 2009, from International Phase of the instant application.

* cited by examiner

*Primary Examiner* — Edward Tso
*Assistant Examiner* — Robert Grant
(74) *Attorney, Agent, or Firm* — Jackson Patent Law Office

(57) ABSTRACT

This invention concerns a vehicle with four wheels, automobile type, non polluting, propelled by electric engine, fed by batteries which take energy to recharge mainly from photovoltaic panels, passive wind rotors which work together with an aerodynamic accelerator (in air at a faster speed in compare to the speed of the wind in atmosphere also when the vehicle is still), and small hydroelectric rotors.

3 Claims, 3 Drawing Sheets

Figure 1:
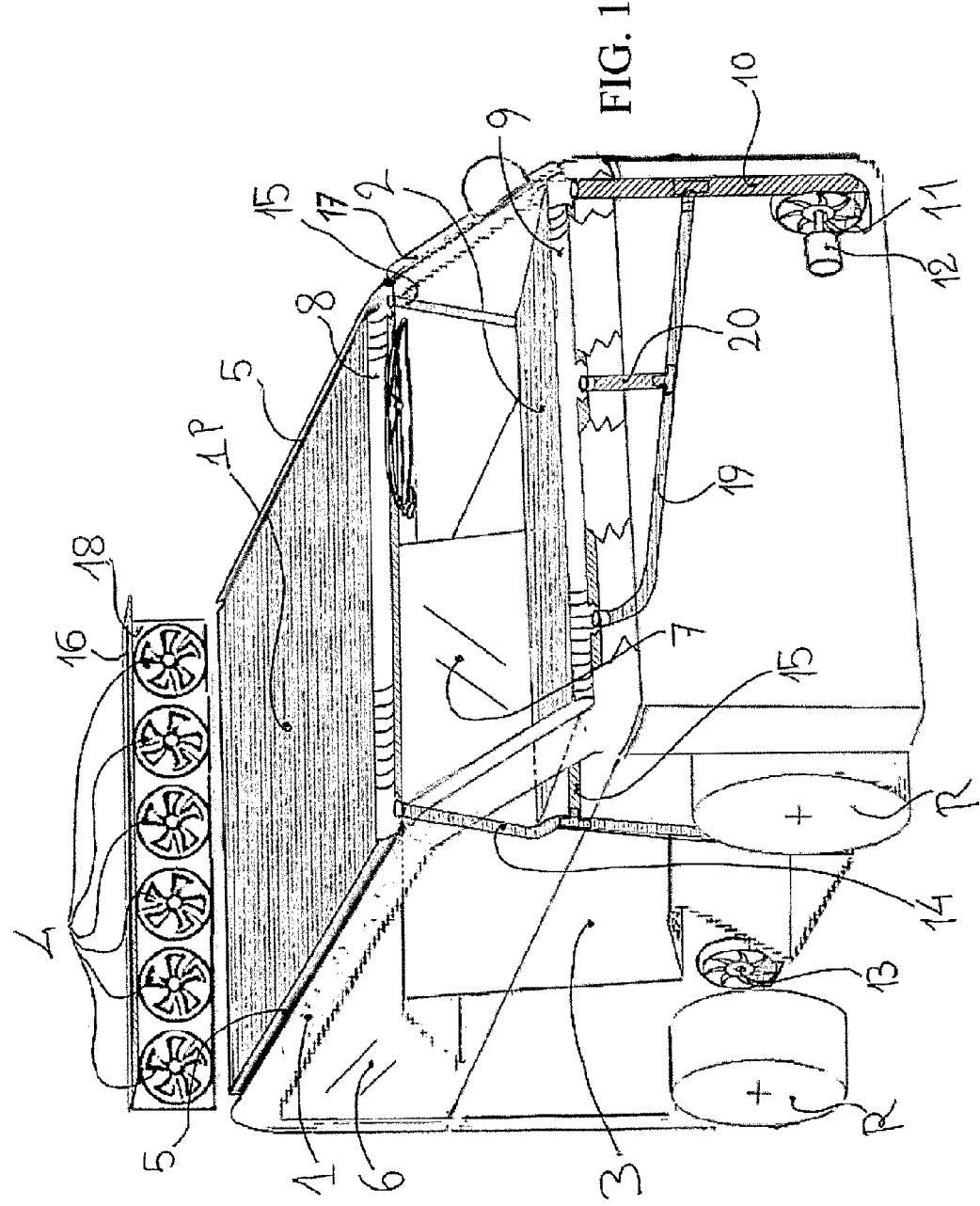

ELECTRIC VEHICLE HAVING A BATTERY CONFIGURED FOR RECHARGING VIA AN ON-BOARD GENERATOR POWERED BY RENEWAL ENERGY SOURCES

TECHNICAL FIELD

The invention which is described is a four-wheel car, non-polluting, driven by an electric engine fed by batteries which draw energy primarily from photovoltaic panels, wind fans and hydro-electric turbines.

BACKGROUND ART

The problem of atmospheric pollution in our cities is caused to a great extent by the polluting discharges from the internal combustion engines of cars which burn fossil fuels. It has, therefore, been recognised that it is necessary to replace such vehicles with non-polluting cars. At present there are non-polluting vehicles driven by batteries which feed electric engines and which are recharged from the electricity grid, ie plug-in. There are also two and four-seater cars which circulate in our cities, similar to ordinary cars, which have photovoltaic panels which are fitted horizontally on the roofs which are themselves substantially horizontal. Some of the cars of this type are equipped with a passive wind fan which the user can fix onto the roof when the car is stationary to capture wind energy in order to recharge the batteries which feed an electric motor which provides traction. Such vehicles are structurally similar to normal cars but are usually built from carbon or resin to reduce their weight.

The problems with such vehicles are the following: the cars which need to be recharged through connection to the grid, ie plug-in, can almost exclusively only be recharged at the point of departure (the distributors of electric energy along our roads is extremely rare) and this limits the diffusion and the practicality of their use and does not resolve the problem of the pollution produced from the polluting electricity centres which provide the grid with the necessary energy. On the other hand the cars which are presently equipped with photovoltaic panels fitted onto the roof which is itself substantially horizontal, have little autonomy due to the length of time necessary for recharging because the extension of the panels, which are in proportion to their power, is limited to the extent that it is equal to that of the design of the vehicle. The same panels, being fitted horizontally, are in an orthogonal position in relation to the sun only under certain conditions and this reduces their efficiency. The wind fan which the user can fit onto the roof of his vehicle is in itself hardly efficient because it is activated by the wind which impacts on the blades at low atmospheric speed.

DISCLOSURE OF THE INVENTION

The drawbacks which have been described above are resolved by the present invention which permits the creation of an electrical battery vehicle, which has no polluting emissions and which does not need to be connected to the electricity grid in order to recharge the batteries which are able to be recharged in a much shorter time and in almost all meteorological conditions. It is able to be fitted with photovoltaic cells on a surface much greater with respect to the orthogonal projection of the vehicle on the ground without any further extension outside of said projection and to be used with much greater efficiency. Fitted with passive fan wheels which work—even when the vehicle is stationary—at a greater speed than that of the atmospheric wind thus enabling them to absorb a greater quantity of wind energy and needing much less time for recharging. They are also able to capture the energy contained in rain water. The vehicle is extremely light and can also be manufactured without using such expensive materials as carbon but it is also capable of offering at the same time greater security to the occupants in the case of a collision. The vehicle manufactured in conformity to the present invention is able to offer better road-holding despite the presence of (heavy) anti-hail plate glass which cover the photovoltaic panels on their upper part. The present invention is realisable in the absence of investments in an ordinary entity in productive structures and it is thus able to be sold on the open market at exceptionally low prices.

It therefore follows from the invention outlined above that a four-wheel vehicle can be manufactured in soldered metal tubing covered by photovoltaic panels or in preformed sheets of plastic or glass resin which provide a flat surface which can be covered by photovoltaic elements fitted longitudinally in an oblique manner with respect to the longitude of the vehicle with the lower part at the front and the higher part at the back and they can be fitted parallel to the latitude of the vehicle itself. This structure will be bolted on to the chassis by means of soldered screws or a similar method of fixing.

At the high back end will be fitted one or more passive fan wheels perpendicular to the longitude of the vehicle, preferably parallel one to the other. At the lower end tempered glass is fixed which will join the elements which have been described above at the high back end of the nose of the car.

The elements described are able to realise: the covered of the compartment, the support of the upper photovoltaic panels, the aerodynamic acceleration of the wind which hits the vehicle from the front and reaches the fan wheels mentioned above—being fitted with lateral guttering which will prevent water coming down on to the lateral surfaces of the vehicle—and direct the rain water down which will activate the hydro-electric fan wheels fitted onto the bottom of the vehicle, which are able to absorb the energy of the falling water, after having obtained an increase of pressure in the descending tubs which are joined to a guttering element fitted at the extreme low front part of the oblique element which is above the fan wheels themselves, finally giving an element of support for the lateral window of the compartment.

At the front of the oblique element, as we have said, there is tempered glass which is steeply inclined to reach such elements with the nose of the car which functions as a wind-screen for the occupants of the car and provides protection from the hail of the lower photovoltaic panels which in short, in cooperation with the oblique element which is above the aerodynamic accelerator, acts for the collection of rain water. The invention provide two photovoltaic panels on the surface: one, as we have just described, fitted above, another fitted below. The lower is not provided with anti-hail protective glass. The vehicle is in the same way fitted with an aluminium, light alloy or steel plate, housed on the chassis which has six bent and six substantially straight pieces. This will replace many of the traditional components used in motor vehicles and is, in fact, able to reduce the weight of the vehicle and its cost and guarantees greater security in the case of a collision. This plate will at the same time serve a hygienic purpose. The photovoltaic panels and the rotating electric generators connected to the hydro-electric and wind-driven fan wheels, above described, recharge an accumulator which feeds the electric engine which drives the car.

DISCLOSURE OF THE INVENTION WITH DESCRIPTIVE DRAWINGS

This invention will become more evident from an analysis of the following detailed description which should be considered together with the attached drawings which give an example of a version specifically realised in conformity to the present invention.

FIG. 1, table 1 represents a perspective view three-quarter side on of the front of the vehicle.

Figure 2:
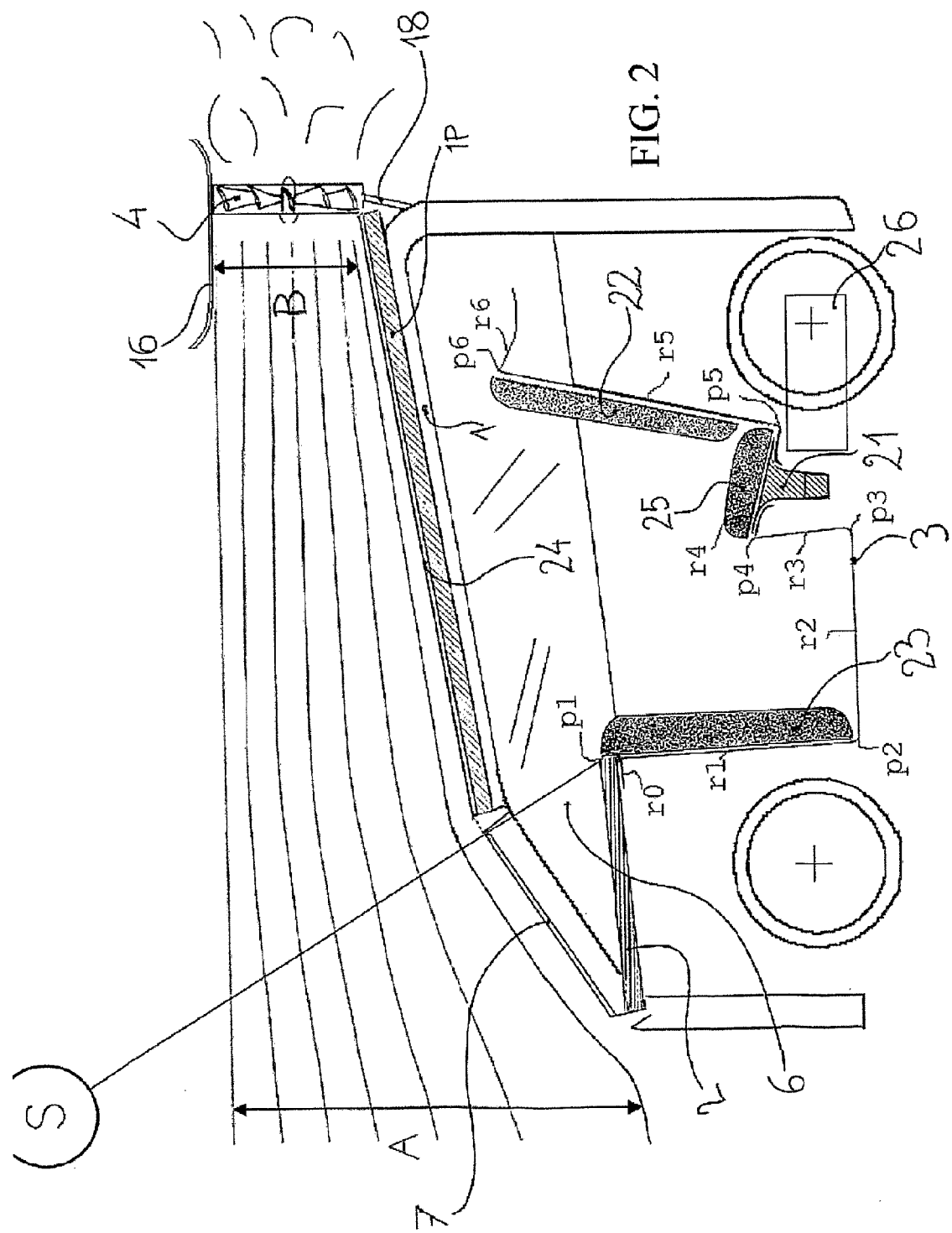

FIGS. 2 (table 2) and 3 (table 3) a view of the left profile of the vehicle both of which show different elements of the invention in question. In particular, in FIG. 1 point 1 shows a chassis in tubes of soldered steel reinforced with ties (not shown). Element 1 shows a quadrangular structure upon which have been mounted and bolted by means of bonding elements and well-known suspension, preferably using a spring or rubber, the photovoltaic panels 1p. Element 1 is attached by means of screws, soldered, or other similar bonding instruments to the chassis not shown in the drawings, to which have been bolted the mechanical organs of the four-wheel vehicle of a well-known structure in conformity to the present state of technical know-how. Element 1p is put onto element 1, as is shown in FIG. 1 and is therefore oblique in respect of the longitude of the vehicle and parallel to its latitude with the low extremes placed to the front and the high ones to the back with an incline with respect to the horizon preferably higher than ten degrees.

A tempered glass 7 along its longitudinal development is steeply inclined with respect to the vehicle and is joined at the extreme (low) front of the element 1p described above to the superior extremity of the front of the vehicle. Element 7 has the function to cooperate with element 1p above the aerodynamic acceleration, in the collecting of rain water as previously explained and the windscreen for the interior, to protect it from the hail of the photovoltaic panels which we will discuss later. Element 1, as said, houses the surface photovoltaic 1p above. The invention present also a photovoltaic surface inferior 2 situated under the plate glass 7 and devoid of the anti-hail protective plate glass. Said surface is realised by a photovoltaic panel jointed by screws to the frame and the chassis as described above.

In a vehicle manufactured in conformity to the present invention, as shown in drawing 1 the elements 1p and 2 can comprehensively have a photovoltaic surface bigger than the orthogonal projection of the vehicle on the ground and can have size equal to those of the other vehicles in the same class while at the same time having a photovoltaic surface of elevated dimensions. Element 1 actually being steeply inclined with respect to the horizon will have a photovoltaic surface superior in extension to its own orthogonal projection on the ground. Element 2 can be extended backwards until it is under the front orthogonal projection of element 1 remaining (the 2) completely illuminated when the vehicle is parked with its front towards the sun as shown in FIG. 2. The disposition, in conformity to the present invention, is strongly oblique to element 1 and 1p and that of element 2 thus enabling the user at the same time to park the car so as to situate the photovoltaic panels in a position close to that orthogonal with respect to the sun thus obtaining an elevated efficiency of the elements above described. Elements 1p and 2 will allow a short battery recharging time while the car is parked. This is the case even during the winter months when the sun is lower in the sky.

The photovoltaic panels above 1p bolted to element 1, should according to this invention, be preferably equipped with anti-hail protective plate glass 24 which will guarantee an extremely elevated life to the photovoltaic cells. Those below (2), as we have said, are unprovided with them. The driveability of a car realised in conformity to the prevent invention will be good when maintaining speed while negotiating bends in that the anti-hail plate glass 24, in front of element 1p, thanks to its inclination will be much lower while the photovoltaic element 2 fitted under the plate glass 7 is very light. The barycentre thus will not have a prohibitive elevation as would happen if the photovoltaic panels were connected, in conformity to the current technical know-how on a horizontal roof whose dimensions are equal to the design of the car and this would be in anti-hail plate glass.

A further advantage that this invention achieves is seen from that fact that in a vehicle conforming to this invention, the tempered anti-hail glass 24 can be slim and therefore lighter, because the hailstones do not hit the surfaces perpendicularly, transferring thus all their kinetic energy, but rather at an angle, because they are diverted towards the front, transferring less energy to the glass. The element 1, and in particular its surface composed of the anti-hail glass 24 which covers the upper photovoltaic panels 1p, and the steeply-angled tempered glass 7, further to their functions described above, have the simultaneous function of accelerating the moving air molecules which make up the wind, along the rising glass surface 7 and the panels 1 p (and in particular their covering) to increase the captured energy and the efficiency of the aerodynamic passive rotors 4 (FIGS. 1 and 2) in the capturing of the wind energy; these rotors conforming to this invention are positioned on the rear upper extremities of element 1, preferably aligned perpendicularly to the sides of the vehicle. The aerodynamic rotors 4 mentioned above will be covered by a layer of air. This does not correspond to that simply in front of them, serving those elements on almost-horizontal surfaces, conforming to present technology. Rather, it corresponds to the air which goes from the forward end of the nose of the car, this being pushed upwards and accelerated, first by the sharply-angled glass 7 and then by element 1 p positioned, and sharply angled, on element 1, until it meets the battery of wind rotors 4 on the rear uppermost extremity of element 1, sitting on a sub-frame preferably made of metal tubes attached by screws or similar to this element 1. Then the wind-driven air in the atmosphere which occupies area A (FIG. 2) will be constrained by elements 7, 1 and 1p in area B (FIG. 2) increasing its speed. Element 4 will be covered, when the vehicle is parked against the wind (which is easy to achieve for a user in the city because the streets are lined by buildings which force the wind to travel in a direction parallel to the street), by a very large volume of air traveling at high speed, elements 7 and 1p having as described accelerated the atmospheric speed of the wind, allowing element 4 to absorb a large quantity of the wind's energy. The aerodynamic accelerator described will evidently be efficient to a greater or lesser degree, depending on the height, distance and shape of any other vehicles which might be parked ahead. The wind rotors mentioned are held by a sub-frame, this in turn being held by element 1, which houses the upper photovoltaic surface 1p; rising and above these is a fin 16. This fin, which obstructs the wind travelling up the rising surface 1p, directing it upwards towards the battery of wind rotors, directing the flow of air to them. That is also the case, to a lesser degree, with wind coming from behind, thanks to an extension of the fin behind the impellers (aeolian rotor). In the preferred form of the invention's realisation the aerodynamic elements 4 for the capture of wind energy consist of passive wind impellers with radial blades positioned along the back end of element 1 each serving the other, aligned vertically, but it is also foreseen that these elements can be on a horizontal axis, singularly, with 'spiral' aerodynamic elements or other rotating mechanical aerodynamic elements for the capturing of wind energy. These rotating aerodynamic elements are connected to generators by mechanical systems, of a geared-strap type, or the positioning of the impellers and the generators on the same axis.

A preferred version of the realisation of this invention has been described here, but of course, variations in its execution are possible without digressing from the overall environment of the industrial patent right found in this patent.

For example, it is foreseen that the sub-frame which holds the wind rotors does not joined (in) the lower part with the upper surface of element 1p but with a distance of about 2 mm to allow the flow of stratum fluid of boundary layer and avoid that this eaten from the impellers. Or also that element 1p is provided with turbolatori or mobile deflectors to channel wind arriving at the aeolian rotor 4 from the side, or that this same is not flat but flexed to cause an increase in pressure corresponding to the aeolian rotor, as for example the upper surfaces of an negative lift aileron, or that the sub-frame 18 which supports the impellers 4, located at the top of the element 1p aren't permanently attached to element 1, but hinged (and/or divided into sections hinged, each one attached to a single aeolian rotor) to point towards the wind, with heavy-duty mechanical or electro-mechanical systems, the elements 4 for the capturing of wind energy located on the extreme top of the upper part of element 1.

In one form of execution of the invention it is further foreseen that element 1 is not soldered to the chassis but hinged at the front and connected at the rear to electromechanical jacks or hydraulic, in such a away as to reduce the incidence and that of element 1p which is soldered to it, in order to reduce the frontal section and the aerodynamic form resistance of the vehicle itself during movement. It is also foreseen that the impellers 4 positioned on the extreme rear of element 1 can be retractable as they can be for example soldered to the sub-frame 18 and it is hinged to element 1 and served by electromechanical jack (or tie-rod) to improve the aerodynamics during movement of the vehicle.

In one form of execution of the invention it is further foreseen that element 1 can be fixed not to the chassis but to the extreme end of the electromechanical jack attached to the chassis that can be orientated always to be approximately orthogonal to the sun, we consider that it includes the right of patent claim in this invention if in any rest position of that element 1 is realised exactly the formal, functional and aerodynamic conditions of the combination of elements 1, 1p and 4 as described above, because the mobility of element 1 is simply a further characteristic. In this way, even if this element 1 and 1p is split into mobile portions which, once aligned, (also partially) form the formal, functional and aerodynamic conditions of the elements 1,1 p and 4 which is the subject of this invention.

The upper element 1 has along the sides of the photovoltaic elements which is supported by it, there are gutters 5 FIG. 1 preferably depressed below the surface between the elements 1 and 1p in such a way as to offer aerodynamic resistance to the wind that reaches the vehicle from a slightly lateral direction (those gutters can also obviously result from elements in plastic proud of the surface of the panels themselves). These gutters act to impede water from rainfall on these panels from falling downwards from the vehicle laterally but rather to constrain the water to go down towards that surface longitudinally or towards the gutters.

Figure 3:
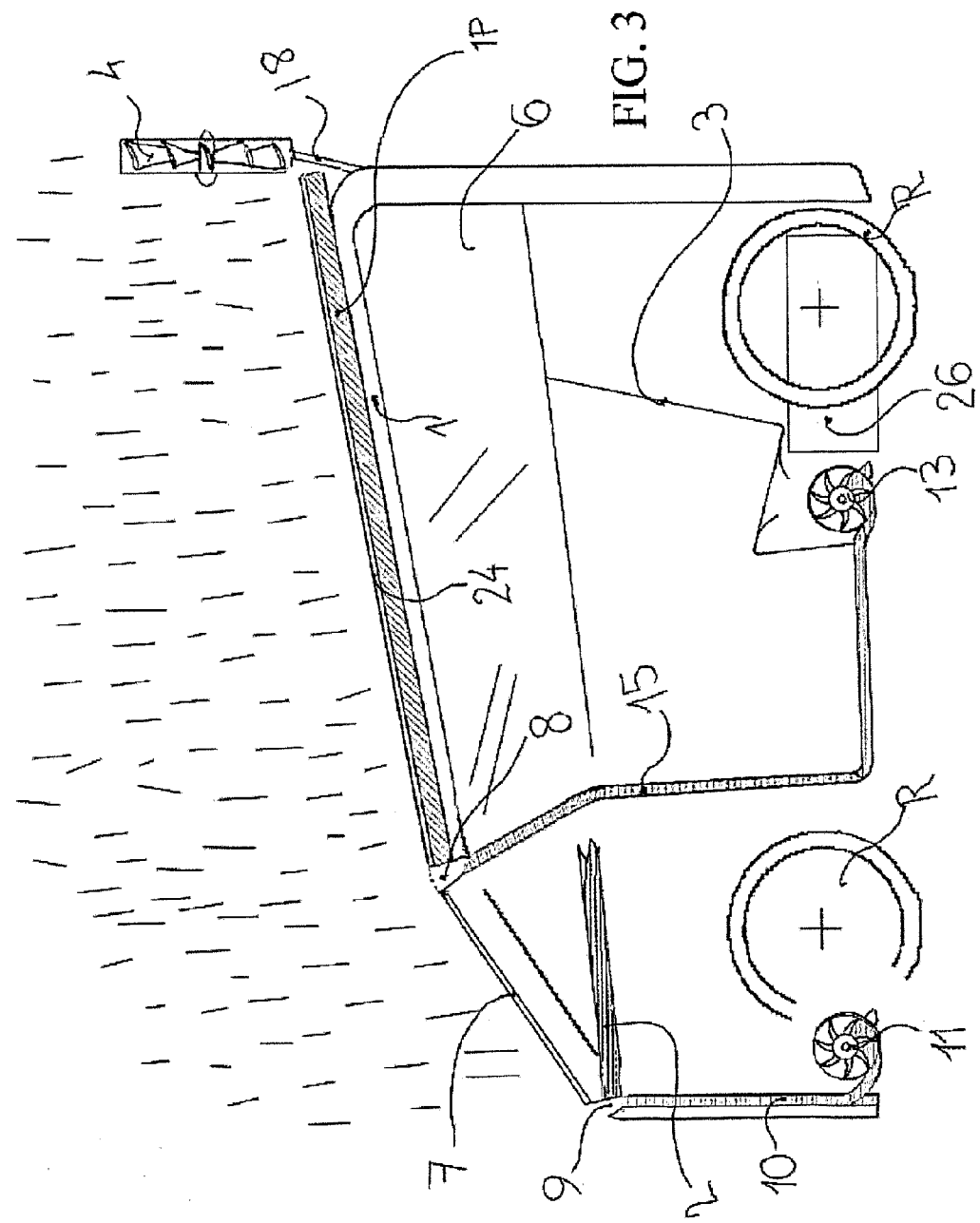

In the extreme lower front element 1P there is an element to collect rainwater 8, similar to the shape of a gutter, as shown in FIGS. 1 and 3, The lower portions of the said gutters have openings connected to tubes 15 and 14 (FIG. 1) joined to a uniting element to a main tube 14. In the extreme lower end of this main tube 14 is located an element of hydro-electric energy capture 13 such as, for example, a small turbine with blades or helicoidally located in the lower part of the vehicle where this element will work with water flowing downwards in a condition of a (limited) increase of pressure of the water filling tubes 14 and 15 which are as high as the distance between the lower end of element 1p and the bottom of the vehicle where a hydro-electric turbine 13 is located. This turbine is connected by known systems of connection to a rotating electrical generator. The element 13 can also have a large diameter and be located in parallel to portions p 5 of element 3, Between the nose and the extreme lower end of the tempered glass 7 is located the element gutter 9. Laterally to element 7 there are two gutters 17 preferably in depression between the extreme lateral edge of said element and the extreme lateral edge of the vehicle. The function of the gutter 17 is that of stopping water from descending laterally from the vehicle. The lower portion of said gutter 9 has openings connected to tubes 19,20 and 10 (FIG. 1) joined to a uniting element to a main tube 10. At the lower end of this main tube 10, corresponding to the bottom of the vehicle, is located an element to capture hydro-electric energy, 11, connected to a generator 12 which feeds the re-charging of the battery 26, The photovoltaic panels and the rotating electrical generators connected to the hydro-electric rotors and to the wind-powered as described above are connected to a system of known battery chargers which charge an accumulator (26 FIG. 3 table 3) attached to the frame of the vehicle which feed the electrical motors (not shown in the diagram) which create the propulsion of the vehicle with a known technical system.

As stated, the invention foresees a chassis element preferably realised in welded steel tubes, on which are attached, as an added characteristic, through screws, bonding or similar mechanical elements of retention, a plate 3 preferably in aluminium, steel or in light alloy preferably in one single piece. This plate can be obtained simply by bending of one plate without any need of stamping, so the costs of this element are comparable to those of a sheet of aluminium, light alloy or steel of which it consists, not even requiring any welding. The plate foresees about 6 bends (p1, p2, p3, p4, p5,p6—FIG. 2) and 6 rectilinear portions (M, r2, r3, r4, r5, r6—FIG. 2), This plate has the following functions; dividing the passenger compartment from the engine bay; dividing the passenger compartment from the front area; carrying out the function of 4 mudguards: front left; front rt.; rear left; rear. rt.; on the opposite surface it carries out the seat function in the portion R4, the back in the portion (R5); make the floor of the vehicle in the portion (R2), the cockpit of the vehicle in the portion (R1), and supports the photovoltaic panel 7 located under the windscreen in the portion (R0); function at the same time as an anti-intrusion barriers (that is an element of protection against accidental side collision) thanks to the fact the profile of element 3, that results from the bending, carries out this work at the longitudinal end. All the elements that come from element 3 are shorter than the bumper of another vehicle. If another vehicle collides with element 3 it cannot intrude into the vehicle without having consumed part of the kinetic energy in the bending of said plate corresponding to the point of impact. Due to said plate being located perpendicularly to the longitudinal aspect of the vehicle, the impact would tend to compress rather than flex as happens with normal anti-intrusion barriers.

The function of protecting the occupants from head-on collisions also falls to the front portion (R1) of the element 3, covered by element 23 FIG. 2 in material similar to foam rubber to distribute the pressure of an impact to the front portion of the vehicle on the occupants on a larger surface.

On portions R4 and R5 of element 3 is attached to elements 25 and 22 by light foam rubber on the seats and the seat-backs to increase the comfort of element 3 in the portions functioning as a seat.

Element 3, in the portions R4 presents two openings under the central part of the seat.

In this opening is a bag in nylon or other synthetic material that is taken at its upper end through hooks. This whole creates a hygienic element of extremely light weight to which the user will be able to access by removing the cushion 25, and clean by simply changing the bag.

Plate 3, in the preferred shape of this invention, is located slightly inside the external lateral limit of the vehicle in such a way that the function of the anti-intrusion element is subject to the impact of other vehicles only after the moment in which these strike the external extremities of the vehicle and absorb part of their own energy by deforming, rendering progressively the transfer of kinetic energy kinetic into the compartment.

Element 3 is, as already stated, preferably realised with one single bent plate, but it could be composed in a executive version of more than one plate connected to each other through welding or strong mechanical elements of retention such as screws or similar with the aim of adapting the thickness of the various portions for reasons of weight or safety. It is foreseen also that element 3 is composed of a sandwich of two or more plates sandwiching material which can absorb kinetic energy such as a tube in square sections, synthetic materials or beehive-shape or similar. Or reinforced with inserts in a light synthetic material.

The invention foresees, as a further characteristic, that on the side extremities of element 1 are attached hinges to the tempered glass 6 which divides laterally the compartment from the exterior. These last are able to rotate on the hinges upwards where they can be attached with known systems of mechanical retention. In the portions (R1) of element 3 they are instead attached by hinges to the doors. These can of course be protected by an anti-intrusion tubes attached by hinges to the chassis. A further advantage that the invention, and in particular element 3, in its working in combination with element 1, can be seen in the fact that it allows the avoidance of constructing any specific support element for the door or for the side glass, thus keeping the production costs and the weight extremely low and allowing the centralisation of the mass, given the absence of door-frames located on the lateral external surface of the vehicle, improving road-holding.

Although in this document are illustrated and described some practical versions of the invention in question it is evident that to experts of the specific technology become obvious now some modifications and variants, and consequently the claims which follow below must be interpreted as protecting any variant equivalent conform to the invention.

Furthermore as the elements that realise this invention offer the described different peculiarities and advantages, even autonomous, intend to defend the rights of this patent even in the case of partial execution of the invention.

Best Way to Realise the Invention

The most economical method to put the invention into practice is that represented graphically in the designs with a frame of steel tubes. To create elements 1p of the roof, it would be preferable to use photovoltaic panels, elements already on the market, and therefore with the photovoltaic cells already located and connected to panels already provided with anti-hail protection and supported by an aluminium structure, with the aim of reducing production costs.

The invention claimed is:

1. An electric vehicle comprising:
a chassis;
a battery;
wind generators configured to charge the battery when the vehicle is stationary and to retract when the vehicle is in movement;
a first aerodynamic element, placed on the top of the wind generators, extending away on the front and back part of these, defining a first end, the first end being bent upward, and a second end opposite the first end, the second end being bent upward;
a second aerodynamic element including a roof oblique forming together with the windshield a continuous surface longitudinally oblique-flat or slightly concave/convex-extending from the low front end to the high rear end of the car, the second aerodynamic element being configured to cooperate with the first aerodynamic element, to accelerate air speed of wind and direct the wind to the wind generators when the vehicle is stationary;
a surface of photovoltaic cells configured to charge the battery;
the second aerodynamic element supporting the surface of photovoltaic cells in orthogonal position as regards to the sun, being positioned in its longitudinal development at an oblique angle in relation to a horizontal plane;
a jack configured to vary the angle of incidence of the second aerodynamic element to improve the aerodynamics of the vehicle during movement of the vehicle;
the lower end of the retractable wind generators being placed on the top of the rear high end of the second aerodynamic element;
the wind generators with the first aerodynamic element placed on top of them being retractable to improve the aerodynamics of the vehicle during movement of the vehicle.

2. An electric vehicle according to claim 1, further comprising:
an electrical generator configured to charge the battery;
a turbine mechanically coupled to the electrical generator;
a conduit configured to conduct fluid in a downward direction to the turbine, thereby powering the turbine;
a first gutter on a first side of the second aerodynamic element, the first gutter being configured to conduct fluid toward the conduit; and
a second gutter on a second side of the second aerodynamic element, the second gutter being configured to conduct fluid toward the conduit.

3. An electric vehicle according to claim 1, further comprising:
an electrical generator configured to charge the battery;
a turbine mechanically coupled to the electrical generator; and
a conduit configured to conduct fluid in a downward direction to the turbine, thereby powering the turbine.

* * * * *